(12) United States Patent
Høj et al.

(10) Patent No.: US 9,546,663 B2
(45) Date of Patent: Jan. 17, 2017

(54) HEAT CIRCULATION PUMP

(75) Inventors: Finn Mathiesen Høj, Aarhuis N (DK); Thomas Blad, Bjerringbro (DK)

(73) Assignee: GRUNDFOS MANAGEMENT A/S, Bjerringbro (DK)

( * ) Notice: Subject to any disclaimer, the term of this patent is extended or adjusted under 35 U.S.C. 154(b) by 307 days.

(21) Appl. No.: 14/004,547

(22) PCT Filed: Feb. 24, 2012

(86) PCT No.: PCT/EP2012/053222
§ 371 (c)(1),
(2), (4) Date: Sep. 11, 2013

(87) PCT Pub. No.: WO2012/123237
PCT Pub. Date: Sep. 20, 2012

(65) Prior Publication Data
US 2013/0343935 A1 Dec. 26, 2013

(30) Foreign Application Priority Data
Mar. 12, 2011 (EP) .................................. 11002071

(51) Int. Cl.
*F04D 13/00* (2006.01)
*F04D 13/06* (2006.01)
(Continued)

(52) U.S. Cl.
CPC ....... *F04D 13/0693* (2013.01); *F04D 13/0606* (2013.01); *F04D 13/0686* (2013.01);
(Continued)

(58) Field of Classification Search
CPC ..................................................... F04D 29/426
See application file for complete search history.

(56) References Cited

U.S. PATENT DOCUMENTS

| 7,036,892 B2 * | 5/2006 | Suzuki ................... F04C 2/102 303/116.4 |
| 2004/0160142 A1 | 8/2004 | Marioni |

(Continued)

FOREIGN PATENT DOCUMENTS

| AT | EP 1256722 B1 * | 2/2007 | ......... F04D 13/0666 |
| CN | 1760535 A | 4/2006 | |

(Continued)

OTHER PUBLICATIONS

EP 2072828 Google Translation from Google patents.*

*Primary Examiner* — Charles Freay
*Assistant Examiner* — Thomas Cash
(74) *Attorney, Agent, or Firm* — McGlew and Tuttle, P.C.

(57) ABSTRACT

A heat circulation pump includes a pump housing (1) with a pump impeller arranged therein which is driven by an electric motor arranged in a motor housing (8) which axially connects to the pump housing (1). The heat circulation pump also includes a terminal box (12) which is axially connected to the motor housing (8) in order to receive electric and/or electronic components of the engine control. A plug or socket (34) of an electric plug connection is arranged on the outside of the terminal box (12) for the electric connection. The plug or socket (34) is/are axially offset with respect to the terminal box (12) and is/are arranged adjacent to the motor housing (8).

20 Claims, 7 Drawing Sheets

(51) Int. Cl.
  *F04D 29/02* (2006.01)
  *H02K 5/12* (2006.01)
  *F04D 29/42* (2006.01)
  *H02K 5/128* (2006.01)
  *H02K 5/22* (2006.01)
  *H02K 7/14* (2006.01)

(52) U.S. Cl.
  CPC ......... *F04D 29/026* (2013.01); *F04D 29/426* (2013.01); *H02K 5/128* (2013.01); *H02K 5/225* (2013.01); *H02K 7/14* (2013.01); *H02K 11/33* (2016.01); *F05D 2230/20* (2013.01); *F05D 2300/43* (2013.01)

(56) References Cited

U.S. PATENT DOCUMENTS

2008/0118380 A1  5/2008  Nakanishi
2010/0090635 A1* 4/2010  Andersen ............. F04D 29/426
                                                318/490

FOREIGN PATENT DOCUMENTS

| CN | 101589237 A | 11/2009 | |
| DE | 10 2004 030 721 B3 | 10/2005 | |
| DE | 10 2007 022 070 A1 | 11/2008 | |
| EP | 1 437 819 A1 | 7/2004 | |
| EP | 2072828 A1 * | 6/2009 | ............. F04D 13/06 |

* cited by examiner

HEAT CIRCULATION PUMP

CROSS REFERENCE TO RELATED APPLICATIONS

This application is a United States National Phase Application of International Application PCT/EP2012/053222 filed Feb. 24, 2012 and claims the benefit of priority under 35 U.S.C. §119 of European Patent Application EP 11002071.6 filed Mar. 12, 2011, the entire contents of which are incorporated herein by reference.

FIELD OF THE INVENTION

The invention relates to a heating circulation pump with a pump housing with a pump impeller, which is arranged therein and which is driven by an electrical motor arranged in a motor housing connecting axially to the pump housing, with a terminal box connecting axially to the motor housing, for receiving electrical and/or electronic components of the motor control and with a plug or socket of an electrical plug connection for the electrical connection, the plug or socket being arranged outside on the terminal box.

BACKGROUND OF THE INVENTION

Such heating circulation pumps are counted as belonging to the state of the art. They typically comprise pump housing with a suction connection and a pressure connection as well as a pump impeller arranged therein. An electric motor is provided for the drive of the pump impeller, whose shaft carries the pump impeller. The stator surrounding the rotor is arranged in a housing which on its side facing the pump housing comprises a flange or similar connection element, via which the motor housing, in particular the stator housing, is connected to the pump housing. A terminal box is provided for the electric connection of the motor and is arranged on the axial side of the stator housing which is away from the pump housing. The terminal box typically also comprises the motor electronics, thus for example a frequency converter. A heating pump of the previously mentioned type is typically known from DE 10 2004 030 721 B3.

SUMMARY OF THE INVENTION

Such heating circulation pumps of smaller and medium construction type are manufactured on a large scale, which is why even the smallest of improvements could already lead to a large saving with regard to the manufacture and/or assembly. One constantly strives to improve these pumps on the one hand with regard to technology, and to design them such that they are more reliable, and on the other hand to lower the manufacturing and assembly costs.

The heating circulation pump according to the invention comprises a pump housing with a pump impeller arranged therein, which is driven by an electric motor arranged in a motor housing connecting axially onto the pump housing. A terminal box for receiving electrical and/or electronic components for the motor control connects axially to the motor housing and this terminal box is provided with a plug or a socket of an electrical plug connection which serves for the electrical connection. According to the invention, the plug or the socket is arranged axially offset to the terminal box and adjacent to the motor housing.

The basic concept of the solution according to the invention is not to arrange the plug or the socket for the electrical connection of the motor in the region of the terminal box, but axially offset thereto and adjacent to the motor housing. This arrangement has the advantage that the electrical plug connection is arranged in a region next to the motor which is typically not used, and thus does not axially project beyond the terminal box. This region laterally of the motor is typically not usable in any case, since with modern permanent magnet motors which are constructionally long, the pump housing projects radially beyond the motor housing in this region and thus creates a free space which is unused and is thus available.

It is particularly advantageous if the plug or the socket is arranged such that the counterpart of the plug connection can be pushed on in the axial direction. The ability to be stuck on in the axial direction thus on the one hand requires no additional free space, since this region must remain accessible in any case, in order to be able to separate the motor head from the pump housing in the case of a defect. The axial push-on direction moreover has the advantage that the plug connection bears on the radial outside of the heating circulation pump in a flat construction manner and is not arranged in a lateral manner, thus transversely to the impeller axis and does not as project radially, as is otherwise usual with radial plug connections. The plug connection with this arrangement can lie practically completely within the outer contour of the pump housing (seen in the axial direction), next to the motor housing which is slimmer inasmuch as this is concerned.

The motor housing at least in the region of the stator has an essentially circular cross section and to the pump housing is provided with an essentially rectangular, but rounded flange. With this flange, the motor housing connects onto the pump housing, wherein screws are led through in the corner regions of the flange and connect the motor housing and thee pump housing. According to an advantageous further development of the invention, the plug, or the socket, is arranged in a radial region which lies between an imagined axial extension of adjacent screws or is radially offset thereto.

Thereby, it is advantageous to arrange the plug or the socket in a region which lies essentially parallel to the throughflow direction of the pump between the suction connection and the pressure connection, and not transversely thereto. This is particularly advantageous if the terminal box is radially projecting in part regions between imagined axial extensions of adjacent screws, as the case may be, even if the outer contour of the pump housing is designed in a protruding manner. Then, specifically, these protruding regions of the terminal box, seen in the axis direction of the impeller, lie in the region of the suction connection or pressure connection, thus in the region of free spaces which in any case cannot be used or are difficultly usable.

Advantageously, a further plug or a further socket is arranged next to the plug or the socket which is provided for the electrical connection, via which further plug or further socket a sensor or an external speed control can be connected. This further plug or this further socket are then advantageously likewise arranged such that their plug connection runs in the axial direction, i.e. the counterpart can be pushed on from a region next to the terminal box in the direction of the pump housing. An external pressure sensor, an external temperature sensor or a flow meter can be connected for example as a sensor. An external control can, for example, be the boiler control of the heating installation, which, for example, sets the pulse width for the motor control in the case of a pulse width control.

It is particularly advantageous if the plug or plugs or the socket or sockets are designed as one piece with at least a part of the terminal box, as a plastic injection moulded part and comprise cast-in contacts which within the terminal box preferably end in or on a circuit board in the terminal box. Thereby, the plugs or sockets are advantageously integrally formed on the base body of the terminal box which comprises the base adjacent to the motor and at least a part of the side walls. The casting-in of the contacts ensures a sealed contact feed-through from the inside of the terminal box to the outside, and on the one hand effects a stable plug or a stable socket and at the same time fixes the circuit board arranged within the terminal box, in which circuit board the contacts end.

If apart from the plug or the socket for the electrical connection, a further plug or a further socket is provided for a sensor or an external control, it is advantageous not to arrange these components directly next to one another, but offset to one another in the axial direction, which improves the accessibility of the respective plug connection.

Since the plug, or the socket for the electric connection, is typically larger or more projecting than that for the sensor or for the control connection, it is useful to arrange the plug or the socket for the electrical connection further towards the pump, thus in the region of the motor housing and to arrange the further plug or the further socket in the region of the terminal box. This arrangement moreover has the advantage that the plug connections do not mutually handicap one another on handling.

It is particularly advantageous if the plug connections are connected by way of a snap connection, i.e. that at least one snap connection is provided between the plug and the socket or between the socket and the plug, so that after sticking or pushing on, the two components are electrically and mechanically connected to one another. The snap connection is thereby designed such that it automatically locks in the push-on direction.

Thereby, advantageously, not only the connection between the plug and the socket, thus the electrical plug connection, but also the connection between the terminal box and the motor housing and/or pump housing is designed as a snap connection, and then the terminal box and the motor housing or the terminal box and the pump housing can be connected to one another without a tool in the same manner by way of pushing on, as is the case with the electrical plug connection. Advantageously, the snap connection is effected in the same direction, thus on pushing the terminal box onto the motor in the axial direction.

Advantageously, the plug or the socket for the electrical connection are designed as a flat plug or flat socket, thus in a manner such that the contacts lie next to one another essentially in a plane and specifically in a plane essentially parallel to the motor housing. A very compact construction manner is achieved in this manner, and in particular the plug connection at the side of the motor housing does not protrude too much in the radial direction on account of this.

Usefully, not only is the plug or the socket which serves for the electrical connection of the heating circulation pump designed as a flat plug or flat socket, but moreover any further plugs or sockets, in particular such a further plug or such a further socket for a sensor or for an external motor control. These then usefully likewise comprise contacts which lie next to one another in a plane which is arranged parallel to the motor housing or essentially parallel thereto, thus does not extend too much in the radial direction.

The invention is hereinafter explained in more detail by way of embodiment examples represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, the heating circulation pump represented by way of FIGS. 1 and 3 to 8 comprises a centrifugal pump with a pump housing 1 with a suction connection 2 and a pressure connection 3 with a channel layout which is formed therebetween and which leads the fluid coning from the suction connection 2 to a suction port 4 of pump impeller 5 which is mounted within the pump housing 1 and whose driven side connects to a channel leading to the pressure connection 3.

The heating circulation pump moreover comprises a motor, here a wet-running motor, whose rotor 6 runs in a can 7 which is filled with fluid. The can 7 is surrounded by a stator, i.e. by the motor windings arranged on the peripheral side around the can 7, as well as by a motor housing 8 which accommodates the stator. The rotor 6 comprises a central shaft 9 which extends to into the pump housing 1 and carries the pump impeller 5, so that the rotation movement of the rotor 6 is transmitted onto the pump impeller 5.

The motor housing 8 at its side which faces the pump housing 1 comprises a flange 10, with which it is connected to the pump housing 1, and via four screws 11 in the corner regions of the flange, is connected to the pump housing 1 in a sealed and fixed manner. In the represented embodiment, the pump housing 1 and the motor housing 8 consist of metal and are manufactured as cast parts.

With the heating circulation pumps represented here, the motor housing 8 is designed as metallic cast housing. For the present invention however, the housing can also be formed by a cast stator, as is then the case if the stator winding is cast into plastic. The motor housing can also be designed as a plastic injection moulded part. It is to be understood that the earth contact which is described in detail further below is then integrated within the plastic and is connected to the stator iron core and the then metallically designed can of the motor, in an electrically conductive manner.

The heating circulation pump furthermore comprises a terminal box 12 which consists of plastic, is attached on the axial side of the motor housing 8, said side being away from the pump housing 1, and engages over the motor housing 8 in a complete manner to its axial side and in a partial manner radially, i.e. on the peripheral side.

The spatial descriptions axial and radial which have been cited above and are cited hereinafter relate to the rotation axis 13 of the rotor 6 or of the pump impeller 5. The axial sides are thus the sides which run essentially perpendicularly to the rotation axis 13, whereas radial surfaces are the surfaces which extend parallel to the rotation axis.

The motor housing 8 in the flange region has a rounded, essentially square cross section, whereas the remaining part of the motor housing 8, thus the part connecting to the terminal box 12 has an essentially circular cross section and therefore has a peripheral surface which has the shape of a cylinder surface. Whereas the pump housing 1 and the motor housing 8 are releasably connected to one another by way of four screws 11, the terminal box 12 which consists of plastic is fastened on the motor housing 1 by way of snap connections. For this, the terminal box 12 comprises four tongues 15 which extend out of the side walls 15 of the terminal box towards the pump housing 1 and at whose end snap connections 16 are laterally arranged, wherein these snap projections engage behind snap recesses 17 in the motor housing 8 which are integrally formed on the motor housing 8 in the region of the flange 10. These snap recesses 17 are formed in each case by a step in a tubular guide 18 on the motor housing 8 (see FIG. 8), said guide being directed from the flange 10 to the terminal box 12.

When placing the terminal box 12 onto the motor housing 8 in the axis direction, thus in the push-on direction 19, the tongues 15 get into the guides 18 which are arranged flush with these, wherein the snap projections 16 by way of a transverse deflection of the tongues move laterally inwards past the steps forming the snap recesses 17, and after moving over these lock in outwards by way of the elastic return of the tongues 15 and thus hold the terminal box 12 on the motor housing 8.

The terminal box 12, seen in the direction of the rotation axis 13, has an essentially rectangular outer contour and in the corner regions, thus in the region of an imagined axial extension of the screws 11, is designed in a recessed manner, so that the screws 11 are accessible to a tool applied from the axial direction, even with a stuck-on terminal box 12. These corner recesses are indicated at 20.

With this shaping, horizontal edge regions 21 and vertical edge regions 22 of the terminal box 12 result with the represented vertical installation position (suction connection 2 and pressure connection 3 lie vertically over one another).

Figure 1:
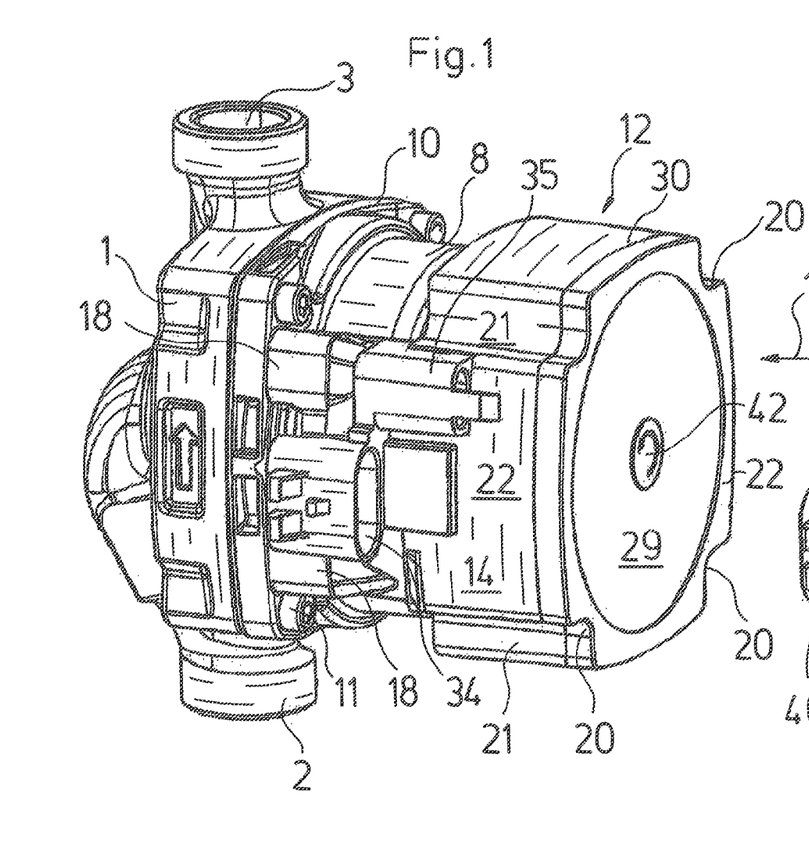
FIG. 1 is a simplified perspective representation of a heating circulation pump according to the invention.
Figure 2:
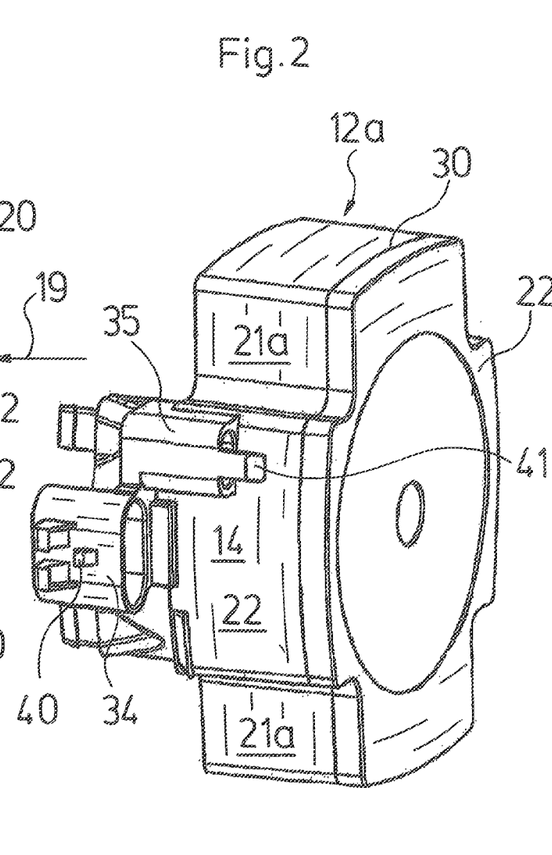
FIG. 2 is a terminal box with radial widenings in a representation according to FIG. 1.
Figure 3:
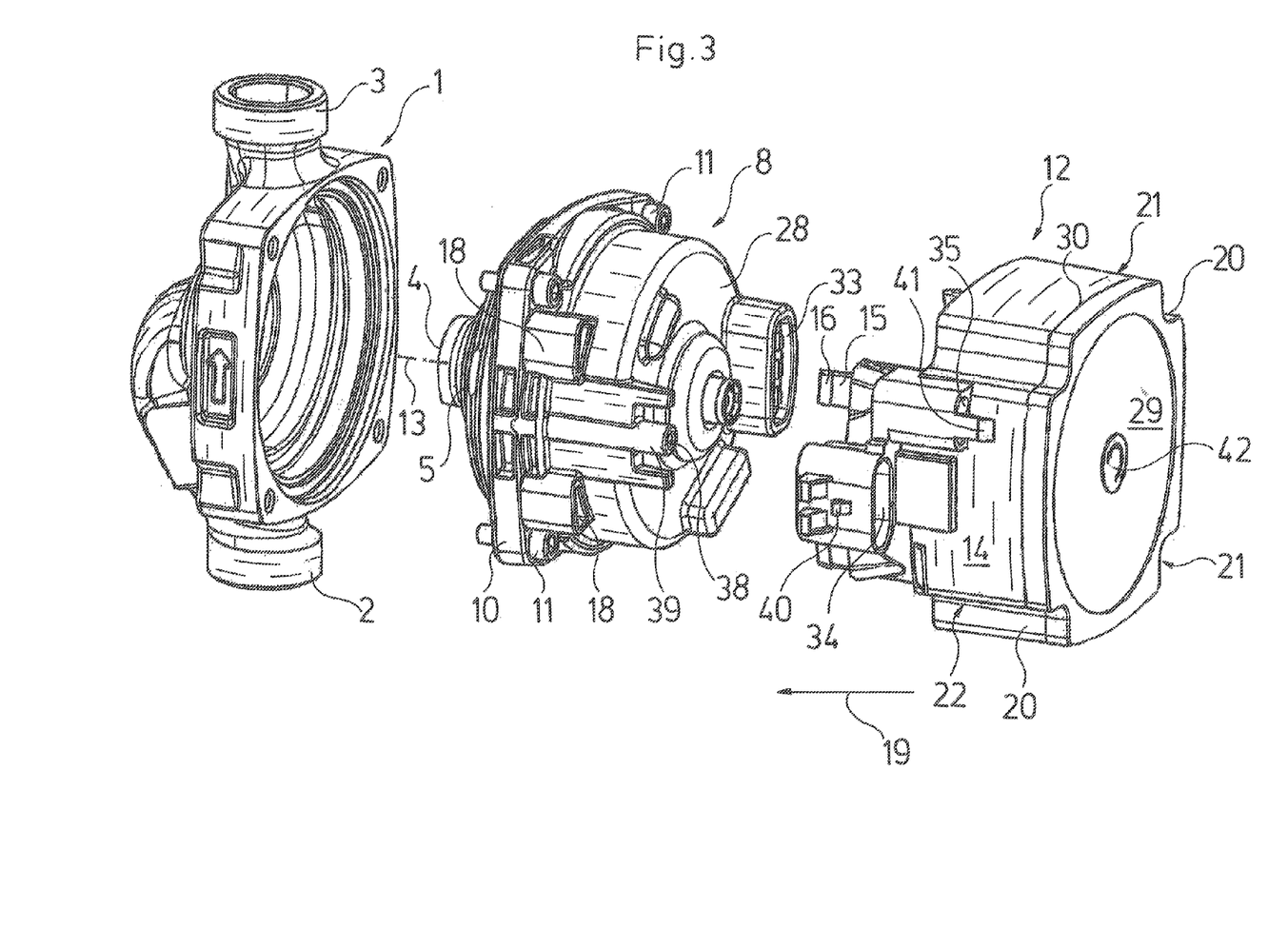
FIG. 3 is a perspective exploded representation of the pump, motor and terminal box.

The vertical edge regions 22 with the shown embodiment are used for leading out electric contacts, whereas the horizontal edge regions 21 are used for the arrangement of electronic components within the terminal box. Since constructionally equal pumps can be designed with electric motors with different motor electronics, with the use of different terminal boxes which differ only in the radial extension of the horizontal edge regions 21, the inner volume of the terminal box, as is evident from a comparison of FIG. 1 and FIG. 2, can be varied without having to change the electrical connections here, and specifically neither on the motor side nor on the terminal box side. The extended horizontal edge regions in FIG. 2 are characterised at 21a, the terminal box at 12a.

Electrical contacts are arranged in the vertical edge regions 22, and specifically, seen in the axis direction from the terminal box 12 in the direction of the pump housing 1, the contacts 23 leading to the motor winding are arranged in the right vertical edge region 22 and the contacts 24 led out to a plug connection for the electrical connection of the motor are arranged in the left vertical edge region 22. These contacts 23 and 24 are to be recognised in the sectioned representation according to FIG. 6. They are each formed from sheet metal, thus as punched parts and in groups are designed equally, i.e. all contacts 23 are constructionally equal to one another as well as all contacts 24 constructionally equal amongst one another.

Figure 4:
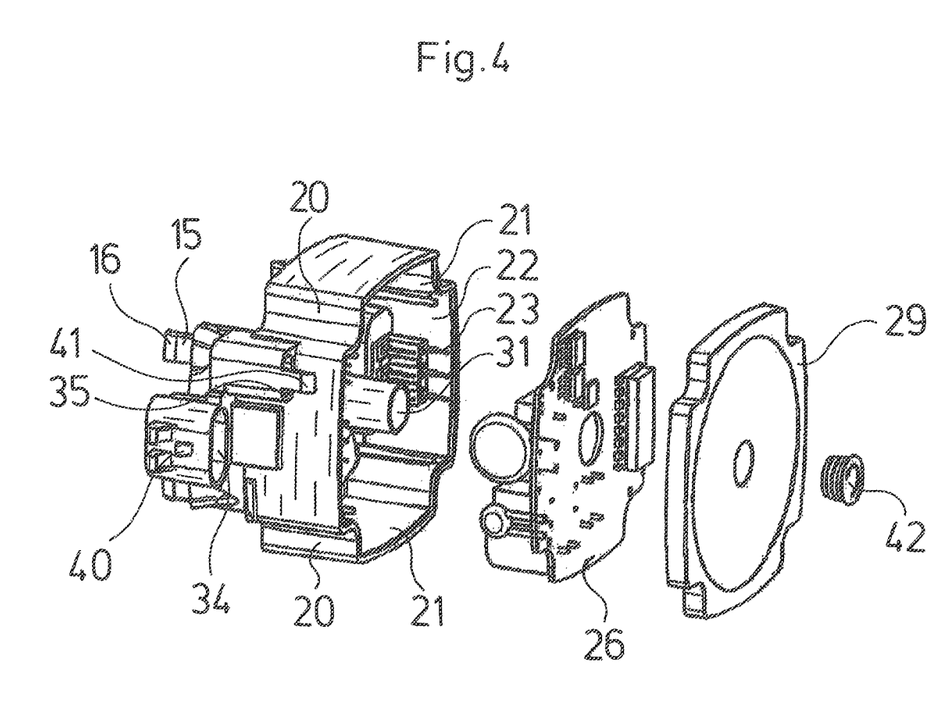
FIG. 4 is a perspective exploded representation of the terminal box according to FIG. 3, with regard to the terminal box construction.
Figure 5:
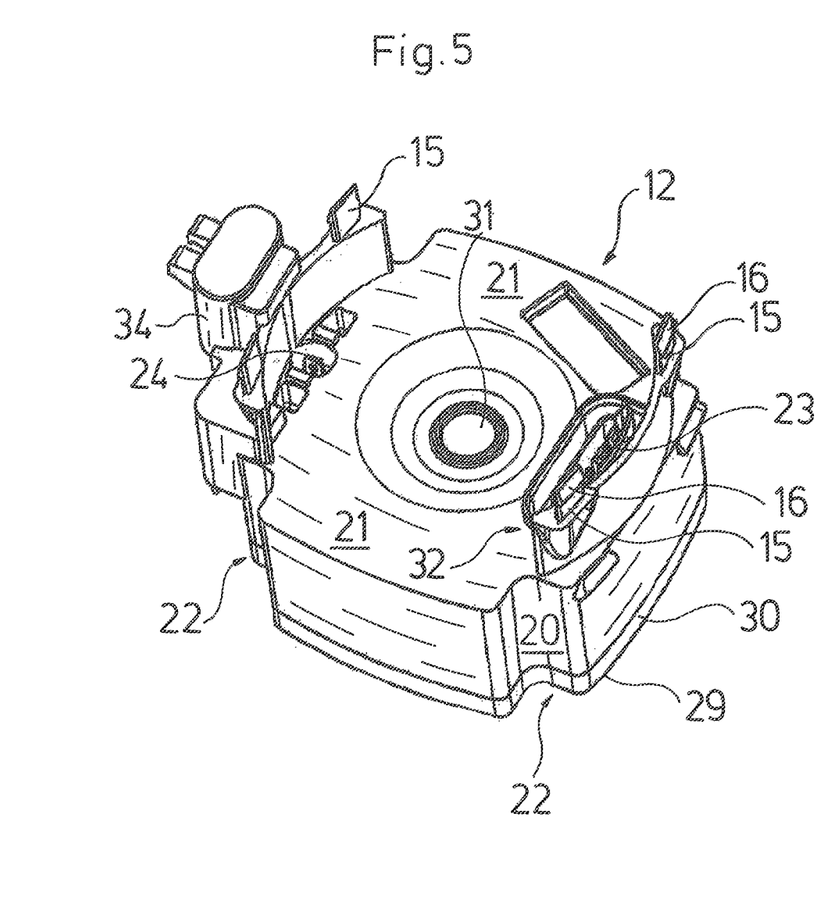
FIG. 5 is a perspective view of the terminal box from below.
Figure 6:
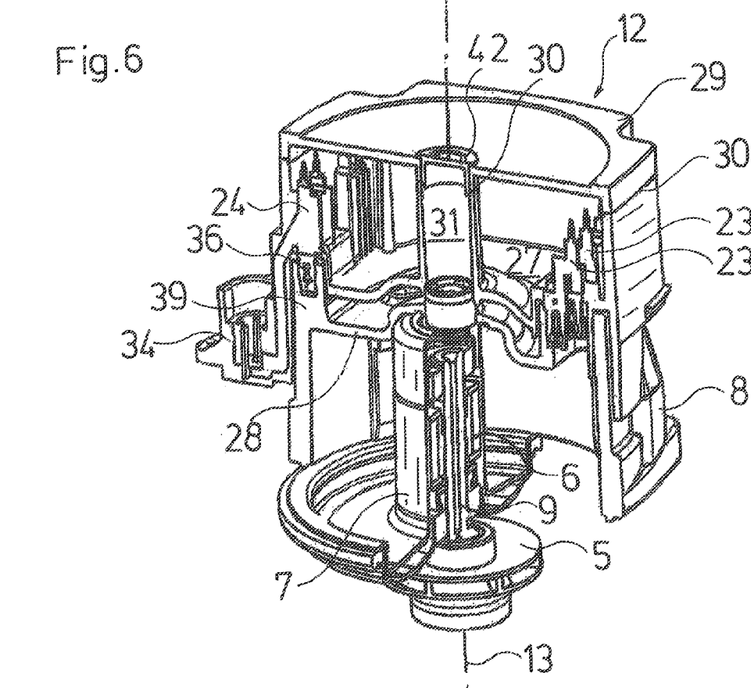
FIG. 6 is a perspective longitudinal sectioned representation of the terminal box and motor, with an applied pump impeller.

All contacts 23 and 24 as well as the further contacts 25 which are arranged on the left side in the vertical edge region 22 and which serve for the motor control, end in the terminal box 12 on a circuit board 26 which in the representation according to FIG. 6 is not represented for reasons of an improved overview, but is visible in the exploded representation according to FIG. 4 and which carries the electrical and electronic components of the motor control, here in particular a frequency converter.

The contacts 23, 24 and 25 are sealingly cast into the terminal box 12 which is formed from thermoplastic plastic, and specifically the contacts 23 into the base 27 of the terminal box 12 and the contacts 24 and 25 into the base 27 or the side wall 14 which is adjacent thereon.

The base 27 of the terminal box 12 is designed in a completely closed manner and is designed distanced to the axial wall 28 of the motor housing 8 (see FIG. 6). The base 27 merges into the likewise closed side walls 14 and the axial end of the side walls 14 is closed by a cover 29 which is likewise designed in a closed manner (closed with respect to the inside of the terminal box). The cover 29 is connected to the base body of the terminal box 12 consisting of the base 27 and walls 14, with a material fit by way of a peripheral welding seam 30. In this manner, the terminal box inside is not only closed in a sealed, but hermetic manner, i.e. the sensitive electronics located therein are reliably protected from the penetration of dust, water and gases.

The welding seam 30 is formed by laser welding from the cover side. For this, the cover 29 is manufactured form a material which lets through the laser beam, whereas the base body, thus the base 27 and the side walls 14 are manufactured from a material which is essentially impermeable to the laser beam. The welding is effected in a manner such that the laser beam is directed from the cover side onto the end-sides of the side walls 14 which face the cover. Thereby, the laser beam goes through the cover 29 which is transparent to the laser beams, up to the end-sides of the side walls 14 where it melts the material which due to the heat effect also melts with the cover material and in this manner forms a hermetic welding connection between the side walls 14 and the cover 29, by which means the terminal box 12 is hermetically closed to the outside. Thereby, the welding is not only effected in the region of the outer lying walls 14, but also in the region of the central recess 31, thus at a location which is otherwise poorly accessible to welding.

A central recess 31 passes through the terminal box 12, runs in the axial direction, is closed by a plug 42 and is not connected to the inside of the terminal box. This recess 31 leads to an opening in the axial wall 28 of the motor housing 8, said opening being likewise closed by a screw and via which the free end of the shaft 9 is accessible in order, given a blockage of the rotor 6, to be able to rotate this freely by hand. The screw closing this opening is designed as a type of grub screw with a hexagon socket, wherein the hexagon socket receiver is designed such that the screw remains on the tool on removal, so that when removing the plug 42 by way of a key, this screw can be removed and then the shaft 9 can be manually rotated by way of a further tool. The openings are then closed again in the reverse sequence. The recess 31 passes through the terminal box 12, thus in the axial direction, so that a hermetically closed annular space results in the terminal box 12.

Inasmuch as it concerns the contacts 23 which are provided for the connection to the motor winding, these are formed into the base of the terminal box 12, and specifically in the right vertical edge region 22, in the manner of a socket 32. A plug 33 on the axial wall 28 and projecting axially to the terminal box 12 is formed on the motor housing 8 and on placing the terminal box 12 onto the motor housing 8 is connected to the socket 32, via which the electrical connection between the terminal box 12 and the motor winding is created.

Figure 7:
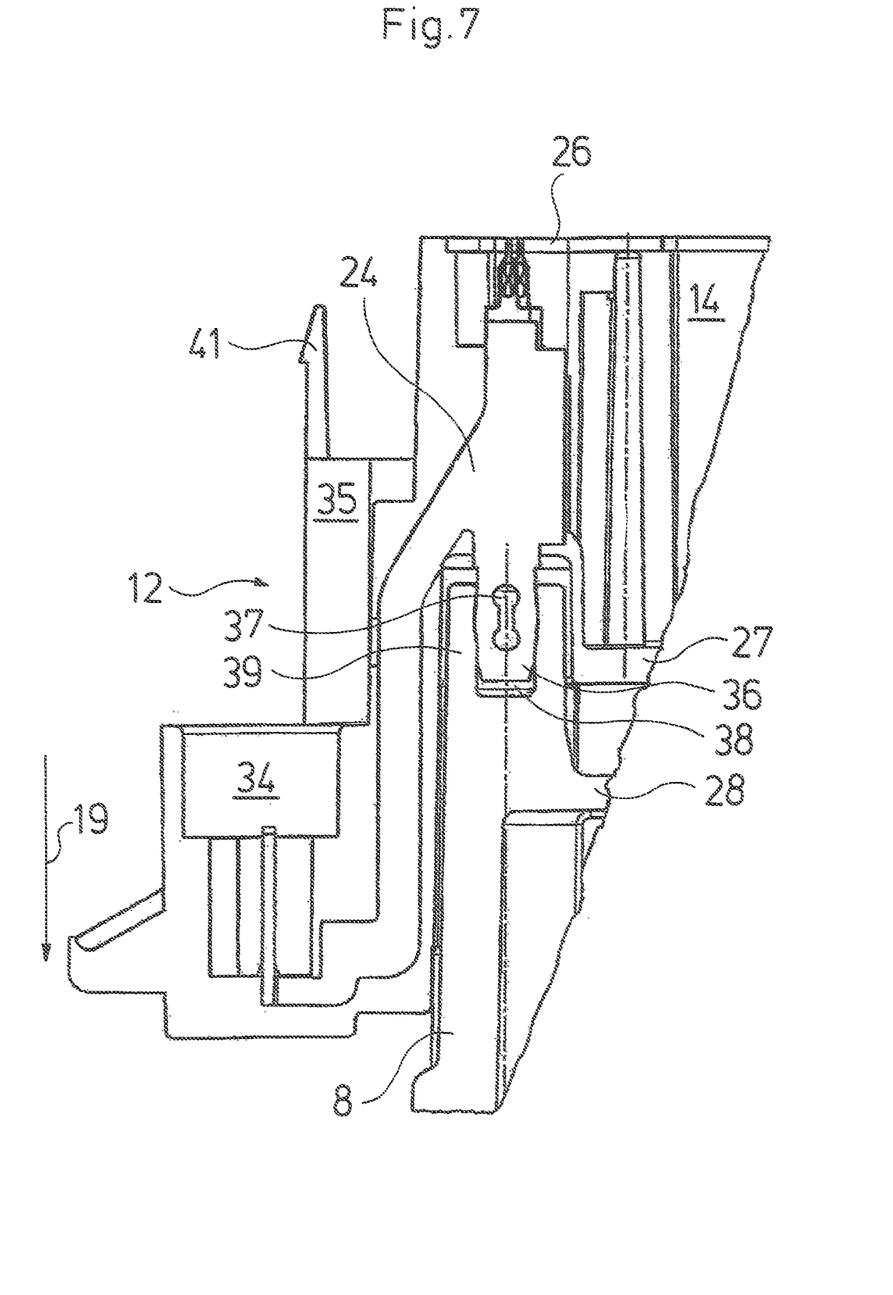
FIG. 7 is an enlarged representation of a longitudinal section in the region of the earth contact between the terminal box and motor.
Figure 8:
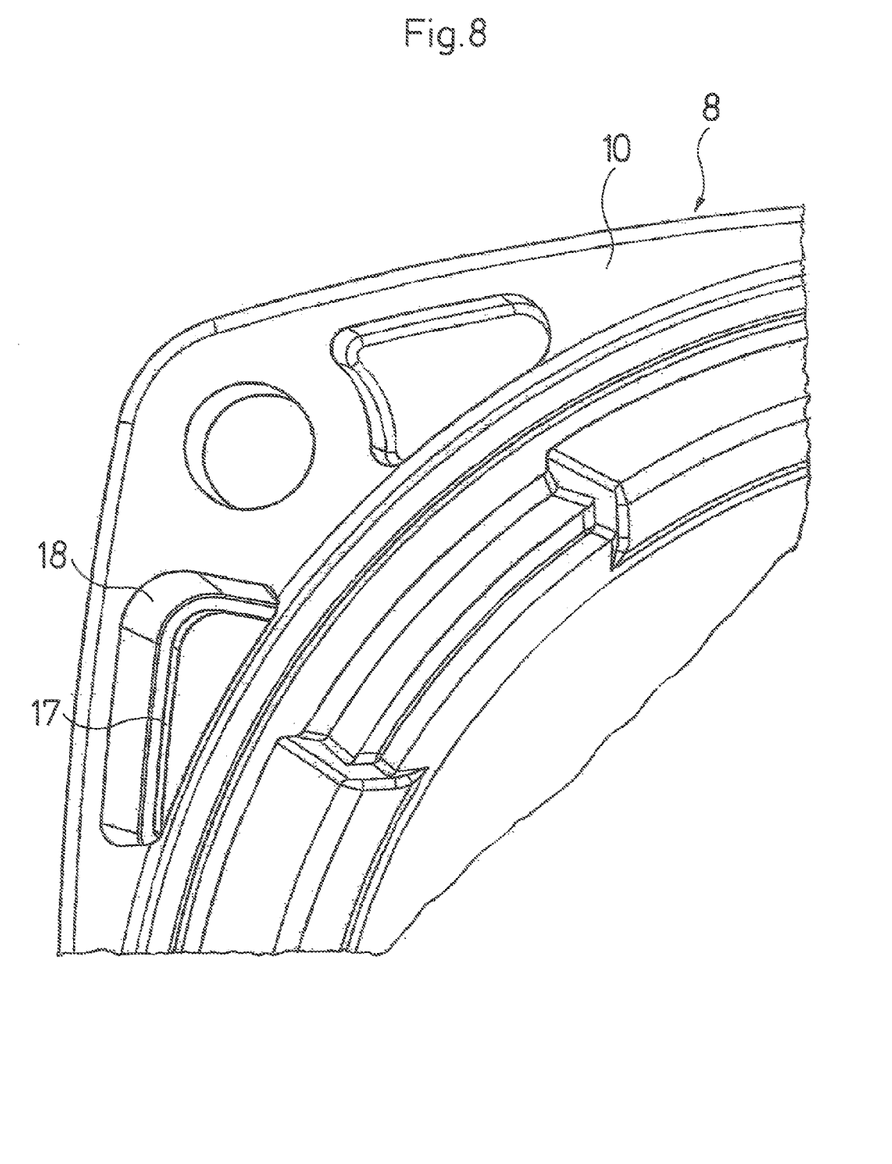
FIG. 8 is an enlarged representation showing a view of the corner region of the motor housing flange from the pump side.

On the oppositely lying left side of the vertical edge section 22 of the terminal box 12, the contacts 24 with one leg are led out to a socket 34 and the contacts 25 to a socket 35. One of the contacts 24, specifically the contact represented in FIG. 7, is an earth contact and serves for connecting the metallic motor housing 8 to the corresponding earth connection of the socket 34 or to the respective earth connection on the circuit board 26 within the terminal box 12. For this, the contact 24 on one leg comprises an insert part 36 which in the sheet of the page has a slightly crowned or convex shape, as well as a central longitudinal recess 37 in the insert direction of the insert part 36. A socket-like recess 38 is provided in an axial prominence 39 on the axial wall 28 of the motor housing 8, in a manner which is flush with the insert part 36 of the earth contact. The transverse dimension of the recess 38 is slightly smaller that the transverse extension of the insert part 36 in the crowned region, so that on inserting the insert part 36 into the recess 38, the insert part at least elastically, possible also plastically is deformed, by which means an intimate contact between the insert part 36 and recess 38 in the motor housing 8 and thus a reliable earthing is ensured. The recess 37 is provided, so that the insert part 36 can also deform plastically as the case may be.

The non-earth contacts 24 which with regard to the shaping are formed identically to the earth contact, likewise comprise an insert part 36 with a recess 37, but are peripherally cast with plastic in the region of the insert part 36, and here a free space is on the motor side, since the prominences 39 are provided quasi in a point like manner only in the region of the insert part 36 of the earth contact.

The contacts 24 and thus in particular also the earth contact which has an intimate connection to the motor housing 8, in the base 27 or in the side wall 14 is designed branched into two legs (see FIG. 7) and runs obliquely out of the terminal box to the pump housing 1, parallel along the outer periphery of the motor housing 8, but however ends at a distance in front of the flange 10 of the motor and is angled by 180° where the contacts 24 together form the socket 34 which serves for receiving a connection plug at the end of a cable of an electrical supply lead. The housing of the socket 34 is formed as one piece with the terminal box 12. The socket 34 is arranged offset to the terminal box 12 next to the motor housing 8 on the outer periphery of this. A plug engaging into this socket 34, can be inserted in the axial direction and specifically in the direction of the pump housing 1, and then lies next to the terminal box 12, and specifically next to the left vertical edge region 22. The socket 34 comprise a snap projection 40 which is part of a snap connection whose other part is provided on the counterpart, thus on the plug.

The socket 35 which receives the contacts 25 is led out of the terminal box in a similar manner, but through the side wall 14. The socket 35 which is formed there, in the representation according to FIG. 3, at the left vertical edge region 22 bears on the outer periphery of the terminal box 12, but differently to the socket 34, is not arranged offset towards the motor housing 8, but lies directly next to the terminal box 12. There, the socket 35 comprises a snap projection 41 which secures the plug engaging into to this socket against release. The sockets 34 and 35, as with the socket 32, are manufactured as one piece with the terminal box 12 with the plastic injection moulded method, thus by way of peripherally injecting the contacts 23, 24, 25 with the manufacture of the terminal box base body.

The sockets 34 and 35 are designed as flat sockets in a manner such that their contacts 24 and 25 respectively are located in each case next to one another in a plane arranged essentially parallel to the motor housing 8. By way of this arrangement, the radial construction space next to the motor housing 8 or terminal box 12 is comparatively small.

If the motor housing is not designed as a metallic cast housing, but as a plastic housing or as a cast mass surrounding the stator, then the recess 38 in the prominence of the motor housing is provided with a contact, for example formed by a hollow-cylindrical metallic socket which is electrically conductively connected to the stator iron core and the metallic can 7, in order to ensure the electrical safely of the heating circulation pump, in the case that one of these components becomes live due to a stator defect.

While specific embodiments of the invention have been shown and described in detail to illustrate the application of the principles of the invention, it will be understood that the invention may be embodied otherwise without departing from such principles.

The invention claimed is:
1. A heating circulation pump comprising:
a pump housing;
a pump impeller arranged in the pump housing;
a motor housing;
an electrical motor arranged in the motor housing, the pump impeller being driven by the electric motor and the motor housing being connected axially onto the pump housing;
a terminal box releasably connected axially onto the motor housing, the terminal box for receiving electrical and/or electronic components of the motor control; and
a plug or socket of an electrical plug connection for electrical connection, said plug or socket being arranged outside on the terminal box, wherein the plug or the socket is arranged adjacent to the motor housing, the plug or socket being integrally connected to the terminal box, the terminal box being formed separate from the motor housing, the plug or socket having an insertion axis, the insertion axis being located at a radially spaced location from a longitudinal axis of the terminal box, wherein the plug or the socket is arranged such that a counterpart of the plug connection can be pushed on in the axial direction and in a direction of the pump housing, the plug or socket extending in the axial direction.
2. A heating circulation pump according to claim 1, wherein the motor housing has an essentially circular cross section and has an essentially rectangular flange which is directed to the pump housing and has corner regions in which screws are led through, which connect the motor housing and the pump housing, and that the plug or the socket is arranged in a radial region which lies between an imagined axial extension of adjacent screws or radially offset thereto.

3. A heating circulation pump according to claim 1, wherein a further plug or a further socket is arranged next to the plug or the socket, via which further plug or socket, a sensor or an external control can be connected.

4. A heating circulation pump according to claim 1, wherein the plug and/or a socket is designed as one piece with at least a part of the terminal box, as a plastic injection molded part, and comprises cast-in contacts which, within the terminal box end in or on a circuit board in the terminal box.

5. A heating circulation pump according to claim 1, further comprising:
   another plug or socket, wherein the plug or socket and the another plug or socket are arranged next to one another and offset to one another in the axial direction.

6. A heating circulation pump according to claim 1, wherein the plug or the socket for the electrical connection is arranged in the region of the motor housing, and a further plug or the further socket is arranged in the region of the terminal box.

7. A heating circulation pump according to claim 1, wherein a plug or a socket is connected to the counterpart of the plug connection by way of a snap connection.

8. A heating circulation pump according to claim 1, wherein the terminal box is connected to the motor housing and/or to the pump housing by way of at least one snap connection.

9. A heating circulation pump according to claim 1, wherein the plug or the socket for the electrical connection is designed as a flat plug and flat socket respectively, wherein the contacts are arranged essentially in a plane parallel to the motor housing.

10. A heating circulation pump according to claim 6, wherein the further plug or the further socket is designed as a flat plug or flat socket, wherein the contacts are arranged essentially in a plane parallel to the motor housing.

11. A heating circulation pump according to claim 1, wherein said pump housing is mechanically connected to said motor housing via screws, said terminal box being connected to said motor housing via a snap connection.

12. A heating circulation pump according to claim 2, wherein said terminal box has an outer terminal box surface, said outer terminal box surface defining a plurality of terminal box recesses, said flange comprising a plurality of flange recesses, each of said terminal box recesses being aligned with one of said flange recesses to define a plurality of screw receiving recesses, wherein at least a portion of each of said screw receiving recesses receives at least a portion of one of said screws.

13. A heating circulation pump according to claim 12, wherein said motor housing has a motor housing flange, the motor housing flange having a plurality of motor housing flange recesses, the terminal box comprising a plurality of terminal box connectors, each of said motor housing flange recesses receiving one of terminal box connectors.

14. A heating circulation pump according to claim 1, wherein said motor housing is arranged between said terminal box and said pump housing, said plug or socket comprising an interior space, said interior space being arranged at a spaced location from an outer periphery of said terminal box, whereby said interior space is located outside of said outer periphery of said terminal box.

15. A heating circulation pump comprising:
   a pump housing;
   a pump impeller arranged in the pump housing;
   a motor housing;
   an electrical motor arranged in the motor housing, the pump impeller being driven by the electric motor and the motor housing being connected axially onto the pump housing;
   a terminal box releasably connected axially onto the motor housing, the terminal box for receiving one or more of electrical components and electronic components of the motor control, said motor housing being located between said terminal box and said pump housing, the terminal box comprising a terminal box longitudinal axis; and
   a plug or socket of an electrical plug connection for electrical connection, said plug or socket being arranged outside on the terminal box, wherein the plug or the socket is arranged adjacent to an outer periphery of the motor housing, the plug or socket being integrally connected to the terminal box, the terminal box being a separate component from the motor housing, wherein the terminal box is formed separate from the motor housing, the plug or socket comprising a plug or socket longitudinal axis, the plug or socket longitudinal axis being located a radially spaced location from said terminal box longitudinal axis, wherein the plug or the socket is arranged such that a counterpart of the plug connection can be pushed on in the axial direction and in a direction of the pump housing, the plug or socket extending in the axial direction.

16. A heating circulation pump according to claim 15, further comprising:
   a plurality of screws, wherein the motor housing has an essentially circular cross section and has an essentially rectangular flange which is directed to the pump housing, said flange comprising corner regions, each of said corner regions comprising a flange recess, said terminal box having an outer terminal box surface, said outer terminal box surface defining a plurality of terminal box recesses, said flange comprising a plurality of flange recesses, each of said terminal box recesses being aligned with one of said flange recesses to define a plurality of screw receiving recesses, wherein at least a portion of each of said screw receiving recesses receives at least a portion of one of said screws, whereby said pump housing is mechanically connected to said terminal box via at least said screws.

17. A heating circulation pump according to claim 16, wherein the terminal box is connected to one or more of the motor housing and the pump housing via at least one snap connection, said plug or socket comprising an interior space, said interior space being arranged at a spaced location from an outer periphery of said terminal box, whereby said interior space is located outside of said outer periphery of said terminal box.

18. A heating circulation pump comprising:
   a pump housing;
   a pump impeller arranged in the pump housing;
   a motor housing;
   an electrical motor arranged in the motor housing, the pump impeller being driven by the electric motor and the motor housing being connected axially onto the pump housing;
   a terminal box releasably connected axially onto one side of the motor housing and said pump housing being connected axially onto another side of the motor housing to define a pump structure, said terminal box being provided at one end of said pump structure and said pump housing being arranged on another end of said pump structure, said one end being opposite said another end with respect to a longitudinal axis of said pump structure, wherein said motor housing is located between said terminal box and said pump housing, the terminal box for receiving one or more of electrical components and electronic components of the motor control, said terminal box comprising a terminal box longitudinal axis, said terminal box being formed separate from said motor housing; and a plug or socket of an electrical plug connection for electrical connection, said plug or socket being arranged on the terminal box, said plug or socket being integrally connected to said terminal box, said plug or socket comprising a plug or socket axis, said plug or axis being located a radially spaced location from said terminal box longitudinal axis, said terminal box being formed separate from said motor housing, wherein the plug or the socket is arranged axially offset relative to the terminal box and arranged adjacent to an outer periphery of the motor housing, the plug or the socket being arranged such that a counterpart of the plug connection can be pushed on in the axial direction and in a direction of the pump housing, the plug or socket extending in the axial direction.

19. A heating circulation pump according to claim 18, further comprising:

a plurality of screws, wherein the motor housing has an essentially circular cross section and has an essentially rectangular flange which is directed to the pump housing, said flange comprising corner regions, each of said corner regions comprising a flange recess, said terminal box having an outer terminal box surface, said outer terminal box surface defining a plurality of terminal box recesses, said flange comprising a plurality of flange recesses, each of said terminal box recesses being aligned with one of said flange recesses to define a plurality of screw receiving recesses, wherein at least a portion of each of said screw receiving recesses receives at least a portion of one of said screws, whereby said pump housing is mechanically connected to said terminal box via at least said screws.

20. A heating circulation pump according to claim 19, wherein the terminal box is connected to one or more of the motor housing and the pump housing via at least one snap connection, said plug or socket comprising an interior space, said interior space being arranged at a spaced location from an outer periphery of said terminal box, whereby said interior space is located outside of said outer periphery of said terminal box.

* * * * *